United States Patent
Hara et al.

(10) Patent No.: US 12,429,719 B2
(45) Date of Patent: Sep. 30, 2025

(54) OPTICAL MODULATION ELEMENT

(71) Applicant: TDK Corporation, Tokyo (JP)

(72) Inventors: Hiroki Hara, Tokyo (JP); Takashi Kikukawa, Tokyo (JP); Hiroshi Take, Hong Kong (CN); Kenji Nagase, Hong Kong (CN); Shuntaro Kodama, Hong Kong (CN)

(73) Assignee: TDK Corporation, Tokyo (JP)

( * ) Notice: Subject to any disclaimer, the term of this patent is extended or adjusted under 35 U.S.C. 154(b) by 319 days.

(21) Appl. No.: 18/164,712

(22) Filed: Feb. 6, 2023

(65) Prior Publication Data

US 2023/0296929 A1  Sep. 21, 2023

(30) Foreign Application Priority Data

Mar. 17, 2022  (CN) .......................... 202210263062.6

(51) Int. Cl.
  *G02F 1/225* (2006.01)
  *G02F 1/03* (2006.01)
  *G02F 1/035* (2006.01)
  *G02F 1/21* (2006.01)

(52) U.S. Cl.
  CPC ............ *G02F 1/0305* (2013.01); *G02F 1/035* (2013.01); *G02F 1/212* (2021.01); *G02F 1/2255* (2013.01); *G02F 2202/20* (2013.01)

(58) Field of Classification Search
  CPC ..................................................... G02F 1/212
  See application file for complete search history.

(56) References Cited

U.S. PATENT DOCUMENTS

| | | | | |
|---|---|---|---|---|
| 4,936,645 A | * | 6/1990 | Yoon | G02F 1/225 385/132 |
| 5,757,985 A | * | 5/1998 | Ishizaka | G02F 1/025 385/39 |
| 7,826,690 B2 | * | 11/2010 | Nakajima | G02F 1/0955 385/6 |
| 9,535,213 B2 | * | 1/2017 | Sugiyama | G02B 6/12 |
| 2005/0175271 A1 | | 8/2005 | Sugiyama et al. | |
| 2011/0151644 A1 | * | 6/2011 | Vaufredaz | H01L 21/76256 438/459 |
| 2015/0138619 A1 | | 5/2015 | Iwatsuka et al. | |
| 2017/0269394 A1 | * | 9/2017 | Tomioka | H04N 9/3129 |
| 2023/0296929 A1 | * | 9/2023 | Hara | G02F 1/2255 385/2 |

FOREIGN PATENT DOCUMENTS

| | | |
|---|---|---|
| JP | 2005-221874 A | 8/2005 |
| JP | 2007-093634 A | 4/2007 |
| JP | 2015-118371 A | 6/2015 |

* cited by examiner

*Primary Examiner* — Rhonda S Peace
(74) *Attorney, Agent, or Firm* — Rimon P.C.

(57) ABSTRACT

An optical modulation element is provided with a substrate, a waveguide layer formed on the substrate, a dielectric layer formed on the waveguide layer, and an electrode formed on the dielectric layer. An outer peripheral end portion of the dielectric layer has an offset area positioned inside an outer peripheral end portion of the substrate. In at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode.

26 Claims, 9 Drawing Sheets

OPTICAL MODULATION ELEMENT

BACKGROUND OF THE INVENTION

Field of the Invention

The present disclosure relates to an optical modulation element.

Description of Related Art

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

The optical modulator is one of the typical electro-optical devices, and a Mach-Zehnder optical modulator in which an optical waveguide is formed by Ti (titanium) diffusion in the vicinity of the surface of a lithium niobate single-crystal substrate has been put to practical use (refer to, for example, Japanese Patent No. 4,485,218). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, Japanese Patent No. 6,456,662 discloses a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

A light modulation element using a lithium niobate film is obtained through a wafer cutting process of cutting a wafer on which a plurality of light modulation elements are formed into individual chips. With regard to the wafer cutting process, Japanese Patent No. 4,742,779 describes that a part of a waveguide layer that is positioned in the vicinity of the substrate cutting line is removed beforehand so as to prevent peeling of the waveguide layer at the chip end surface of the optical modulation element.

In the conventional optical waveguide element described in Japanese Patent No. 4,742,779, a lower clad layer, a waveguide layer, and an upper clad layer are each produced by applying a polymer material or a polymer precursor compound in a melted or dissolved state onto the substrate, followed by curing with light or heat. At this time, the lower clad layer is cured before application of a waveguide layer material and thus cannot serve as an adhesive between the waveguide layer and the substrate surface, so that peeling is likely to occur at the interface between the lower clad layer and the waveguide layer during cutting operation.

However, when the waveguide layer is formed through epitaxial growth of a lithium niobate film on the substrate, peeling of the waveguide layer does not become a major problem, whereas, in an optical modulation element having a complicated layer structure for higher performance, there is a high risk of peeling of a constituent layer other than the waveguide layer. That is, the optical modulation element manufacturing method described in Japanese Patent No. 4,742,779 does not provide sufficient peeling preventive countermeasures.

SUMMARY

It is therefore an object of the present disclosure to provide an optical modulation element capable of reducing a probability that micropeeling of constituent layers occurs at the outer peripheral end portion of the substrate cut out from a wafer.

To attain the above object, an optical modulation element according to an embodiment of the present disclosure includes: a substrate; a waveguide layer formed on the substrate; a dielectric layer formed on the waveguide layer; and an electrode formed on the dielectric layer. The outer peripheral end portion of the dielectric layer has an offset area positioned inside the outer peripheral end portions of the respective substrate and waveguide layer. In at least a part of the offset area, the distance from the outer peripheral end portion of substrate to the outer peripheral end portion of the dielectric layer is equal to or less than the distance from the outer peripheral end portion of the substrate to the outer peripheral end portion of the electrode.

According to the present disclosure, there can be provided an optical modulation element capable of preventing the occurrence of micropeeling between constituent layers at the outer peripheral end portion of the substrate cut out from a wafer.

BRIEF DESCRIPTION OF THE DRAWINGS

FIGS. 1A and 1B are schematic plan views illustrating an optical modulation element according to a first embodiment of the present disclosure, in which FIG. 1A illustrates only a waveguide layer, and FIG. 1B illustrates an electrode layer superimposed on the waveguide layer.

DETAILED DESCRIPTION OF THE EMBODIMENTS

Hereinafter, preferred embodiments of the present disclosure will be described in detail with reference to the accompanying drawings.

Figure 1A:
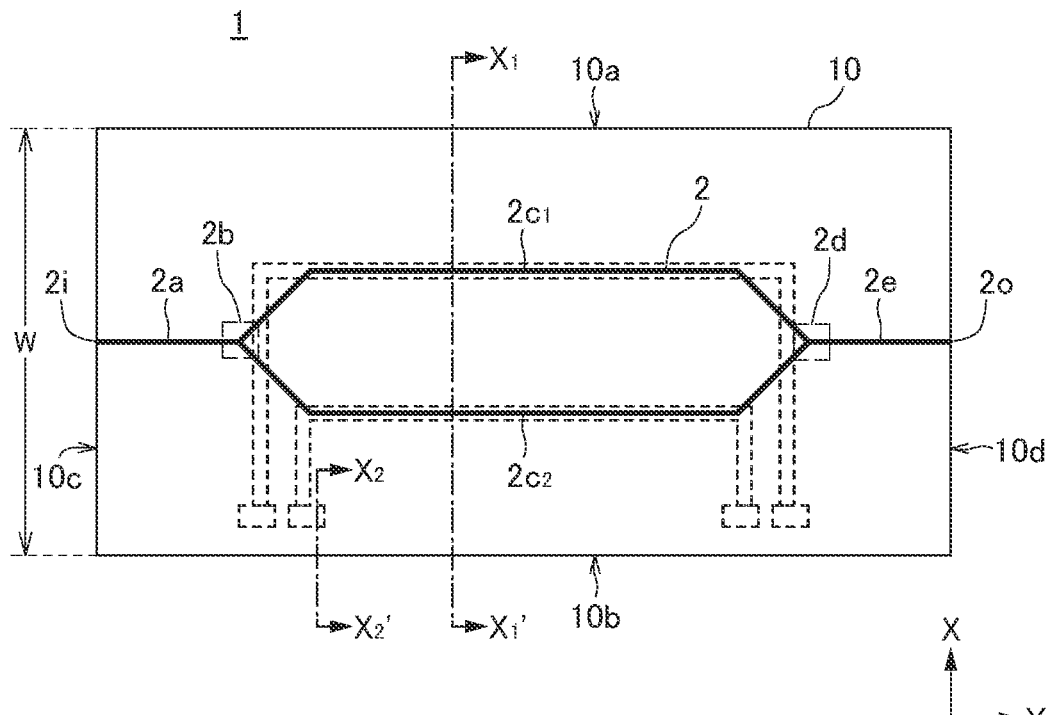
Figure 1B:
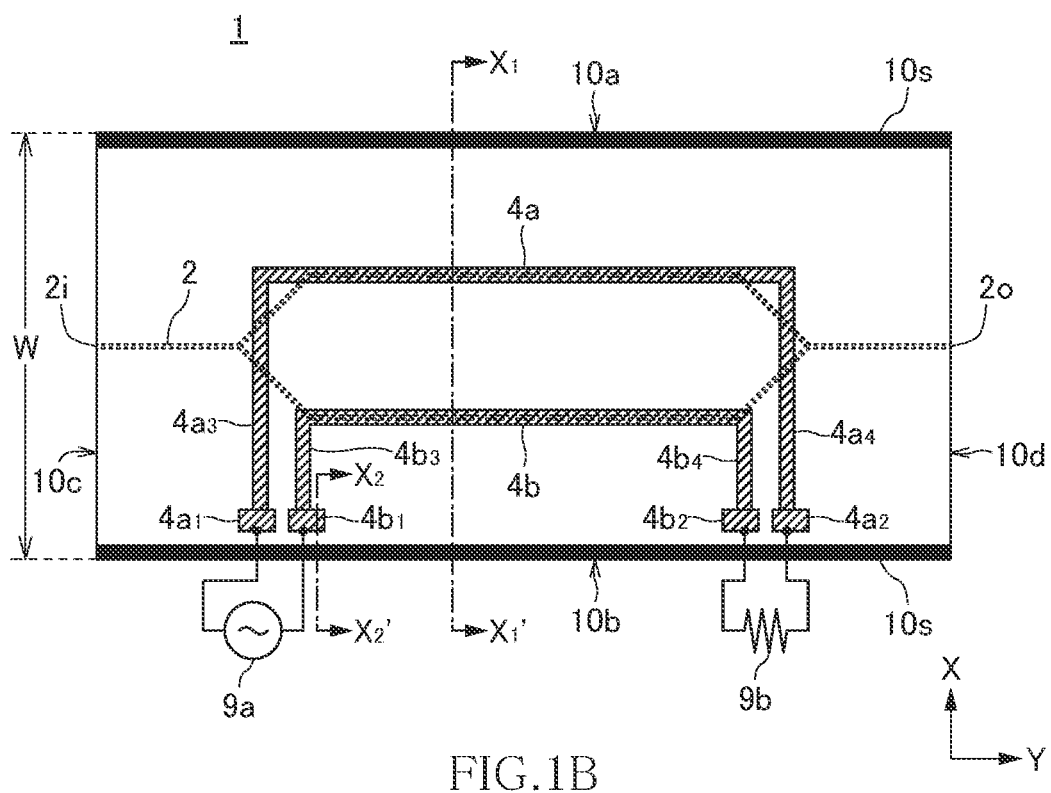

FIGS. 1A and 1B are schematic plan views illustrating an optical modulation element according to a first embodiment of the present disclosure. FIG. 1A illustrates only a waveguide layer, and FIG. 1B illustrates the waveguide layer and an electrode layer in an overlapping manner.

As illustrated in FIGS. 1A and 1B, an optical modulation element 1 includes a Mach-Zehnder optical waveguide 2 formed on a substrate 10 and having first and second waveguides $2c_1$ and $2c_2$ provided in parallel to each other, a first signal electrode 4a provided along the first waveguide $2c_1$, and a second signal electrode 4b provided along the second waveguide $2c_2$. The substrate 10 has a rectangular planar shape and has first and second sides 10a and 10b which are parallel to the longitudinal direction (Y-direction) of the substrate 10 and third and fourth sides 10c and 10d which are perpendicular to the longitudinal direction of the substrate 10. The first and second sides 10a and 10b are parallel to the Y-direction, and the third and fourth sides 10c and 10d are parallel to the X-direction.

The Mach-Zehnder optical waveguide 2 is an optical waveguide having a Mach-Zehnder interferometer structure. The Mach-Zehnder optical waveguide 2 has an input waveguide 2a, a demultiplexer 2b that demultiplexes light propagating through the input waveguide 2a, first and second waveguides $2c_1$ and $2c_2$ extending in parallel from the demultiplexer 2b, a multiplexer 2d that multiplexes lights propagating through the first and second waveguides $2c_1$ and $2c_2$, and an output waveguide 2e through which light output from the multiplexer 2d propagates.

As illustrated, the Mach-Zehnder optical waveguide 2 extends in the longitudinal direction of the substrate 10. An optical input port 2i which is one end of the input waveguide 2a is drawn to the third side 10c of the substrate 10, and an optical output port 2o which is one end of the output waveguide 2e is drawn to the fourth side 10d of the substrate 10. Light input to the optical input port 2i travels through the input waveguide 2a and is demultiplexed at the demultiplexer 2b. The demultiplexed lights travel respectively through the first and second waveguides $2c_1$ and $2c_2$, and are multiplexed at the multiplexer 2d. The multiplexed light is then output from the optical output port 2o of the output waveguide 2e as a modulated light.

The first and second signal electrodes 4a and 4b are provided for applying an RF signal to the first and second waveguides $2c_1$ and $2c_2$, respectively, and constitute an interactive part of the optical modulation element 1 together with the Mach-Zehnder optical waveguide 2. The interactive part of the optical modulation element 1 modulates light guided through the first and second waveguides $2c_1$ and $2c_2$. The first and second signal electrodes 4a and 4b are linear electrode patterns overlapping the first and second waveguides $2c_1$ and $2c_2$, respectively, in a plan view. Both ends of each of the first and second signal electrodes 4a and 4b are drawn to the vicinity of the outer peripheral end of the substrate 10. More specifically, one end and the other end of the first signal electrode 4a are drawn to the vicinity of the second side 10b of the substrate 10 by draw-out parts 4a3 and 4a4, and one end and the other end of the second signal electrode 4b are also drawn to the vicinity of the second side 10b of the substrate 10 by draw-out parts 4b3 and 4b4. The one ends of the first and second signal electrodes 4a and 4b are connected, respectively to a pair of terminal parts $4a_1$ and $4b_1$ provided in the vicinity of the second side 10b of the substrate 10, respectively through the draw-out parts 4a3 and 4b3. The pair of terminal parts $4a_1$ and $4b_1$ constitute a signal input port to which a driver circuit 9a is connected. The other ends of the respective first and second signal electrodes 4a and 4b are connected, respectively to a pair of terminal parts $4a_2$ and $4b_2$ provided in the vicinity of the second side 10b of the substrate 10, respectively through the draw-out parts 4a4 and 4b4. The pair of terminal parts $4a_2$ and $4b_2$ are connected to each other through a terminal resistor 9b.

Differential signals (modulated signals) having the same absolute value but opposite polarities are input to the one ends of the first and second signal electrodes 4a and 4b. The first and second waveguides $2c_1$ and $2c_2$ are each formed of a material, such as lithium niobate, having electrooptic effect, so that the refractive indices of the first and second waveguides $2c_1$ and $2c_2$ are changed with $+\Delta n$ and $-\Delta n$ by an electric field applied to the first and second waveguides $2c_1$ and $2c_2$, with the result that a phase difference between the pair of optical waveguides is changed. A signal light modulated due to the change in the phase difference is output from the output waveguide 2e.

Figure 2:
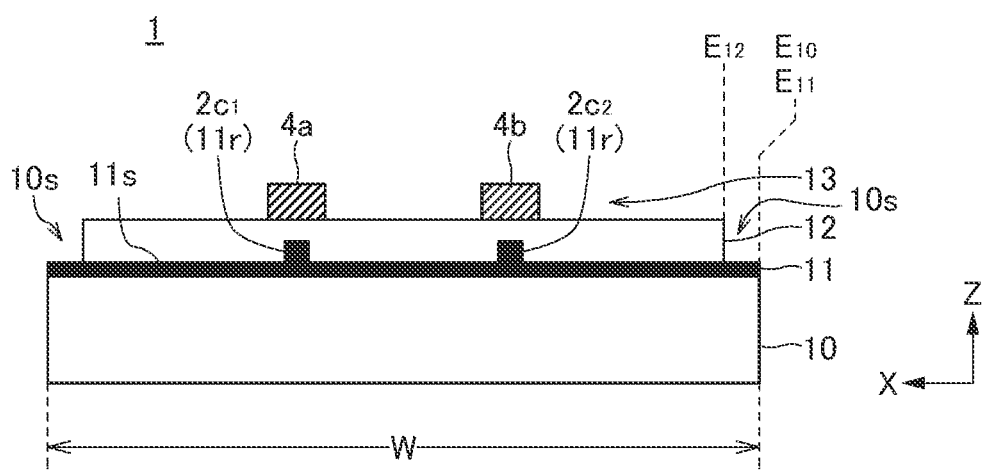
FIG. 2 is a schematic cross-sectional view of the optical modulation element 1 taken along the line $X_1$-$X_1'$ in FIGS. 1A and 1B.
Figure 3:
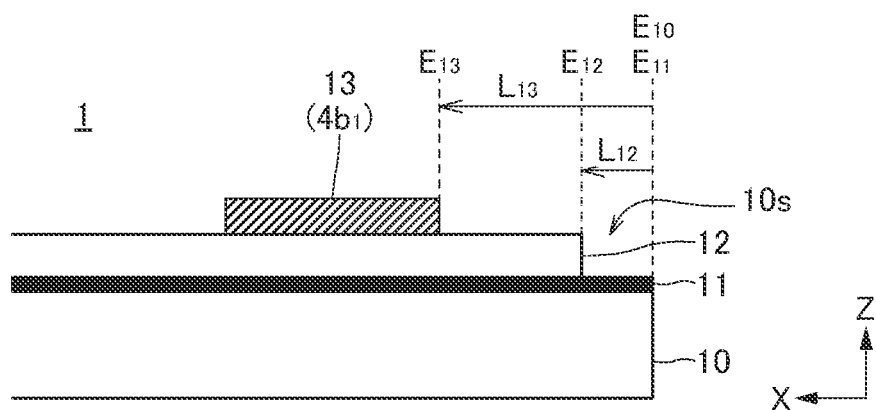
FIG. 3 is a schematic cross-sectional view of the structure of the optical modulation element 1 taken along the line $X_2$-$X_2'$ in FIGS. 1A and 1B, illustrating the vicinity of the outer peripheral end portion of the substrate 10.

FIG. 2 is a schematic cross-sectional view of the optical modulation element 1 taken along the line $X_1$-$X_1'$ in FIGS. 1A and 1B. FIG. 3 is a schematic cross-sectional view of the structure of the optical modulation element 1 taken along the line $X_2$-$X_2'$ in FIGS. 1A and 1B, illustrating the vicinity of the outer peripheral end portion of the substrate 10.

As illustrated in FIG. 2, the optical modulation element 1 has a multilayer structure including the substrate 10, a waveguide layer 11, a dielectric layer 12, and an electrode layer 13 which are laminated in this order.

The waveguide layer 11 formed of an electrooptic material represented by lithium niobate is formed on the main surface of the substrate 10. The waveguide layer 11 has ridge parts 11r, i.e., protruding parts, and a slab part 11s provided on both sides of each of the ridge parts 11r and having a small thickness, and the ridge parts 11r constitute the Mach-Zehnder optical waveguide 2 including the first and second waveguides $2c_1$ and $2c_2$. In the present embodiment, the width (ridge width) of the ridge part 11r can be set to 0.5 μm to 5 μm.

The ridge part 11r is a main part of the optical waveguide and refers to an upwardly protruding part. The protruding part is a part of the electrooptic material film having a larger film thickness than the left and right portions thereof and thus has a high effective refractive index. This allows light to be confined also in the left-right direction, so that a function as a three-dimensional optical waveguide is achieved. The ridge part 11r may have any shape as long as it can guide light, and the film thickness of the electrooptic material at the ridge part 11r should be larger than that at the left and right portions so as to form the projecting profile. In forming the ridge part 11r, a mask such as a resist is formed on the electrooptic material, and the electrooptic material is selectively etched for patterning.

The dielectric layer 12 is formed on at least the upper surfaces of the ridge parts 11r so as to prevent light propagating through the first and second waveguides $2c_1$ and $2c_2$ from being absorbed by the first and second signal electrodes $4a$ and $4b$. The dielectric layer 12 is preferably formed of a dielectric material having a lower refractive index than the waveguide layer 11 and a high transparency, such as $Al_2O_3$, $SiO_2$, $LaAlO_3$, $LaYO_3$, ZnO, $HfO_2$, MgO, or $Y_2O_3$. The thickness of the dielectric layer 12 on the upper surface of the ridge part $11r$ may be about 0.2 μm to 1 μm.

The dielectric layer 12 can reduce light absorption by an electrode more with a larger film thickness and can apply a higher electric field to the optical waveguide with a smaller film thickness. The light absorption and applied voltage of an electrode have a trade-off relation, so that it is necessary to set adequate film thickness according to the purpose. Further, the dielectric layer 12 can reduce more VπL (index representing electric field efficiency) with a higher dielectric constant and can be reduced more in thickness with a lower refractive index. In general, a material having a high dielectric constant has a higher refractive index, so that it is important to select a material having a high dielectric constant and a relatively lower refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The electrode layer 13 includes the first and second signal electrodes $4a$ and $4b$. The width of the first and second signal electrodes $4a$ and $4b$ is slightly larger than the ridge width of the first and second waveguides $2c_1$ and $2c_2$ of a ridge-shaped lithium niobate film. To concentrate an electric field from the first and second signal electrodes $4a$ and $4b$ on the first and second waveguides $2c_1$ and $2c_2$, the width of the first and second signal electrodes $4a$ and $4b$ is preferably 1.1 times to 15 times, more preferably, 1.5 times to 10 times the ridge width of the first and second waveguides $2c_1$ and $2c_2$.

The waveguide layer 3 is not particularly limited as long as it is made of an electrooptic material and is preferably made of lithium niobate ($LiNbO_3$). This is because lithium niobate has a large electrooptic constant and is thus suitable as the constituent material of an electrooptic device such as an optical modulation element. An explanation will now be given of the configuration of the present embodiment, where the waveguide layer 3 is a lithium niobate film.

Although the substrate 2 is not particularly limited as long as it has a lower refractive index than lithium niobate, the substrate 2 is preferably a substrate on which the lithium niobate film can be formed as an epitaxial film. Specifically, the substrate 2 is preferably a sapphire single crystal substrate or a silicon single crystal substrate. The crystal orientation of the single crystal substrate is not particularly limited. The lithium niobate film can be easily formed as a c-axis oriented epitaxial film on single crystal substrates having different crystal orientations. Since the c-axis oriented lithium niobate film has three-fold symmetry, the underlying single crystal substrate preferably has the same symmetry. Thus, when the sapphire single crystal substrate is used as the substrate 2, it preferably has a c-plane, and when the silicon single crystal substrate is used as the substrate 2, it preferably has a (111) surface.

The epitaxial film refers to a film having the crystal orientation of the underlying substrate or film. When the film in-plane surface is defined as an X-Y plane, and the film thickness direction is as a Z-axis, the crystal is uniformly oriented along the X-, Y-, and Z-axes. For example, an epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002), and other equivalent surfaces.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single crystal $LiNbO_3$ (014) has 3 poles.

For the lithium niobate film, it is known that crystals rotated by 180° about the c-axis are epitaxially grown in a symmetrically coupled, twin crystal state. In this case, three poles are symmetrically coupled to form six poles. When the lithium niobate film is formed on a single crystal silicon substrate having a (100) surface, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AAy_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of 2 μm or less. This is because a high-quality lithium niobate film having a thickness more than 2 μm is difficult to form. The lithium niobate film having an excessively small thickness cannot completely confine light in it, disadvantageously allowing the light to penetrate through the substrate 2 and/or the buffer layer 5. Application of an electric field to the lithium niobate film may therefore cause a change in the effective refractive index of the optical waveguide ($10a$, $10b$) to decrease. Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 2 can change the optical refractive index in proportion to the electric field. In the case of the single crystal substrate made of sapphire, the lithium niobate film can be directly epitaxially grown on the sapphire single crystal substrate. In the case of the single crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present disclosure.

As illustrated in FIGS. 2 and 3, an outer peripheral end portion $E_{12}$ of the dielectric layer 12 is positioned inside an outer peripheral end portion $E_{10}$ of the substrate 10 and waveguide layer 11, and an offset area constituted by a step structure 10s is formed in the vicinity of the outer peripheral end portion of the substrate 10. The lower stage surface of the step structure 10s is the upper surface of the waveguide layer 11, and the upper stage surface thereof is the upper surface of the dielectric layer 12. When the dielectric layer 12 is cut together with the substrate 10 and waveguide layer 11 with the result that the outer peripheral end portion $E_{12}$ of the dielectric layer 12 is aligned with the outer peripheral end portion $E_{10}$ of the substrate 10, micropeeling of the dielectric layer 12 may easily occur at the cut surface of the substrate 10. In this case, for example, moisture may enter from the peeled portion, which promotes the peeling, resulting in a reduction in reliability of the optical modulation element 1. On the other hand, in the present embodiment, the outer peripheral end portion $E_{12}$ of the dielectric layer 12 is positioned inside the outer peripheral end portion $E_{10}$ of the substrate 10 and waveguide layer 11, so that the occurrence of the micropeeling of the dielectric layer 12 during the cutting process of the substrate 10 can be prevented. Further, when the outer peripheral end portion $E_{12}$ of the dielectric layer 12 is positioned inside the outer peripheral end portion $E_{10}$ of the substrate 10 and waveguide layer 11, the occurrence of the micropeeling of the dielectric layer 12 due to a shock applied to the optical modulation element 1 can also be suppressed, whereby reliability of the optical modulation element 1 can be increased.

As illustrated in FIG. 1B, the above-described step structure 10s (offset area) in the vicinity of the outer peripheral end portion of the substrate 10 is provided at the first and second sides 10a and 10b which are parallel to the extending direction of the optical waveguide, out of the four sides constituting the outer periphery of the substrate 10 and is not provided at the third and fourth sides 10c and 10d of the substrate 10. This is because the optical input port 2i and optical output port 2o of the Mach-Zehnder optical waveguide 2 are provided respectively at the third and fourth sides 10c and 10d of the substrate 10.

When the dielectric layer 12 covering the ridge part 11r of the waveguide layer 11 at the positions of the optical input port 2i and optical input port 2i is absent, light confinement effect becomes low to significantly deteriorate characteristics of the optical waveguide. On the other hand, the leading end surface of the optical waveguide is required to be extremely flat, so that the end surfaces of the third and fourth sides 10c and 10d of the substrate 10 are subjected to polishing, and micropeeling of the dielectric layer 12 is removed at this time. Thus, it is not necessary to provide the step structure 10s at the third and fourth sides 10c and 10d. However, this does not mean that the step structure 10s should not be provided, and the step structure 10s may be provided at the entire outer peripheral area of the substrate 10 except for the formation positions of the optical input port 2i and optical output port 2o of the Mach-Zehnder optical waveguide 2. That is, of the outer peripheral area of the substrate 10, the vicinity of the formation positions of the optical input port 2i and optical output port 2o only needs to be set as a formation exclusion area of the step structure 10s. For example, the formation exclusion area may be set to a size three times the width of the waveguide. That is, the formation exclusion area of a size corresponding to the width of the waveguide is provided on both sides of each of the optical input port 2i and optical output port 2o.

An offset amount $L_{12}$ of the outer peripheral end portion $E_{12}$ of the dielectric layer 12 from the outer peripheral end portion $E_{10}$ of the substrate 10 is not particularly limited to a specific value as long as the occurrence of the micropeeling of the dielectric layer 12 during the cutting process of the substrate 10 can be prevented and differs depending on a method of cutting the substrate 10. When a cutting method wherein the amount of variation in cutting margin is large or a cutting method with low accuracy of a cutting position is employed, the offset amount $L_{12}$ needs to be increased; when a cutting method wherein the amount of variation in cutting margin is small or a cutting method with high accuracy of a cutting position is employed, the offset amount $L_{12}$ can be reduced. For example, when a blade is used for cutting, the blade is worn out due to an increase in the using frequency, resulting in a reduction in cutting margin. As described above, the offset amount $L_{12}$ of the outer peripheral end portion $E_{12}$ of the dielectric layer 12 is determined considering the cutting margin and positional accuracy during the cutting process of the substrate 10.

The dielectric layer 12 preferably covers the upper surface of the waveguide layer 11 as widely as possible. The dielectric layer 12 plays a role of protecting the entire waveguide layer 11, so that a part of the upper surface of the waveguide layer 11 that is not covered with the dielectric layer 12 is preferably as small as possible. Thus, the offset amount $L_{12}$ of the outer peripheral end portion $E_{12}$ of the dielectric layer 12 is preferably as small as possible and is preferably 10% or less of a width W (see FIG. 2) of the substrate 10 in the same direction as the offset direction of the dielectric layer 12.

In the present embodiment, the terminal parts $4a_1$, $4b_1$, $4a_2$, and $4b_2$ illustrated in FIG. 1 constitute an outer peripheral end portion $E_{13}$ of the electrode layer 13. The outer peripheral end portion $E_{13}$ of the electrode layer 13 is positioned inside the outer peripheral end portion $E_{12}$ of the dielectric layer 12, and an offset amount $L_{13}$ of the outer peripheral end portion $E_{13}$ of the electrode layer 13 from the substrate 10 is larger than the offset amount $L_{12}$ of the outer peripheral end portion $E_{12}$ of the dielectric layer 12. In other words, the outer peripheral end portion $E_{12}$ of the dielectric layer 12 is positioned between the outer peripheral end portion $E_{10}$ of the substrate 10 and the outer peripheral end portion $E_{13}$ of the electrode layer 13, and a distance $L_{12}$ (offset amount of the dielectric layer 12) from the outer peripheral end portion $E_{10}$ of the substrate 10 to the outer peripheral end portion $E_{12}$ of the dielectric layer 12 is smaller than a distance $L_{13}$ (offset amount of the electrode layer 13) from the outer peripheral end portion $E_{10}$ of the substrate 10 to the outer peripheral end portion $E_{13}$ of the electrode layer 13. In the present embodiment, the distance $L_{13}$ to the outer peripheral end portion $E_{13}$ of the electrode layer 13 is the distance from the second side 10b of the substrate 10 to the end surface of each of the terminal parts $4a_1$, $4b_1$, $4a_2$, and $4b_2$ on the side close to the second side 10b of the substrate 10, and the distance $L_{12}$ to the outer peripheral end portion $E_{12}$ of the dielectric layer 12 is the distance from the first side 10a of the substrate 10 to the end surface of the dielectric layer 12 on the side close to the first side 10a of the substrate 10 at the step structure 10s (offset area) provided at the first side 10a of the substrate 10 and the distance from the second side 10b of the substrate 10 to the end surface of the dielectric layer 12 on the side close to the second side 10b of the substrate 10 at the step structure 10s (offset area) provided at the second side 10b of the substrate 10. The offset amount $L_{12}$ of the dielectric layer 12 may be the same as the offset amount $L_{13}$ of the electrode layer 13. Further, there may exist an area where the offset amount $L_{12}$ of the dielectric layer 12 is larger than the offset amount $L_{13}$ of the electrode layer 13 at a part of the vicinity of the outer periphery of the substrate 10 where the electrodes such as the terminal part $4a_1$ are not provided. At any rate, the offset area where the outer peripheral end portion $E_{12}$ of the dielectric layer 12 is positioned inside the outer peripheral end portion $E_{10}$ of the substrate 10 is provided desirably at least in the formation area of the interactive part of the electrode.

In the present embodiment, the outer peripheral end portion $E_{11}$ of the waveguide layer 11 is aligned with the outer peripheral end portion $E_{10}$ of the substrate 10 and does not exist inside the outer peripheral end portion $E_{10}$ of the substrate 10. The reason for it is as follows: the waveguide layer 11 formed of a lithium niobate film is formed by epitaxial growth and is thus very high in bonding strength to the substrate 10, so that when the waveguide layer 11 is cut together with the substrate 10, there is a low probability of the occurrence of micropeeling at the boundary therebetween.

As described above, the optical modulation element 1 according to the present embodiment is obtained by dicing a wafer as an aggregate substrate on which a plurality of optical modulation elements is formed. The waveguide layer 11 is formed on a wafer as the substrate 10, and the dielectric layer 12 is then selectively formed using a mask in an area excluding a cutting margin, followed by formation of the electrode layer 13, whereby the optical modulation element 1 is completed. Thus, the dielectric layer 12 does not exist on the cutting line, so that the dielectric layer 12 is not cut together with the substrate 10, preventing the occurrence of micropeeling of the dielectric layer 12. This can increase the reliability of the optical modulation element 1.

Figure 4A:
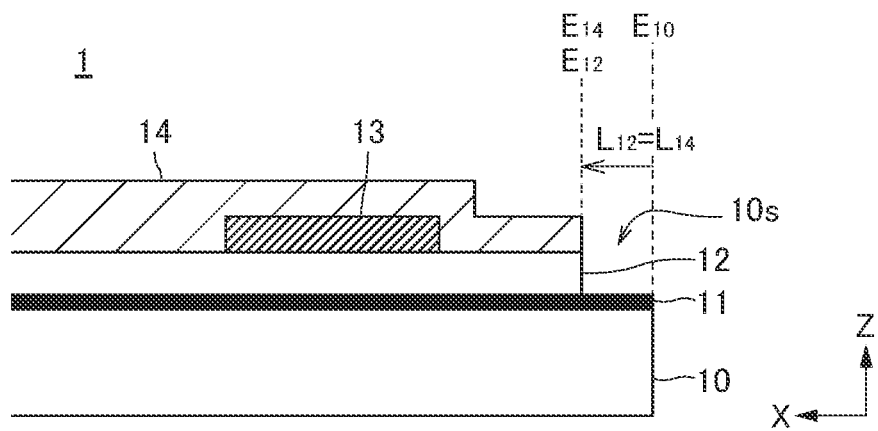
FIGS. 4A to 4C are schematic cross-sectional views each illustrating the configuration of optical modulation elements according to second to fourth embodiments of the present disclosure.
Figure 4B:
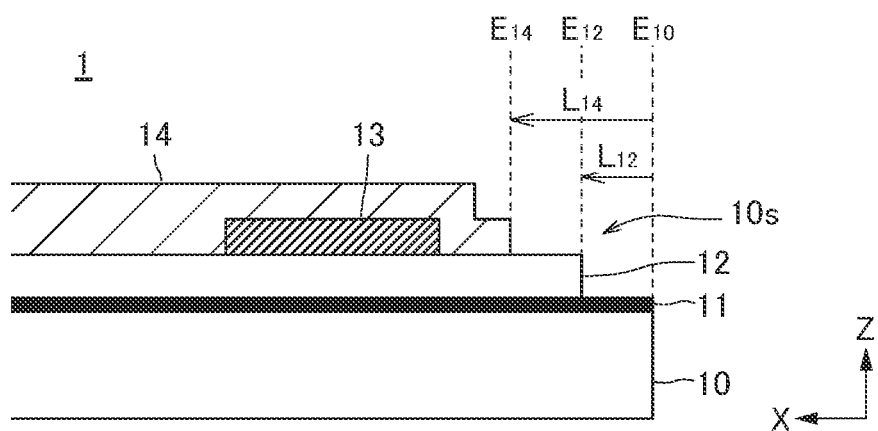
Figure 4C:
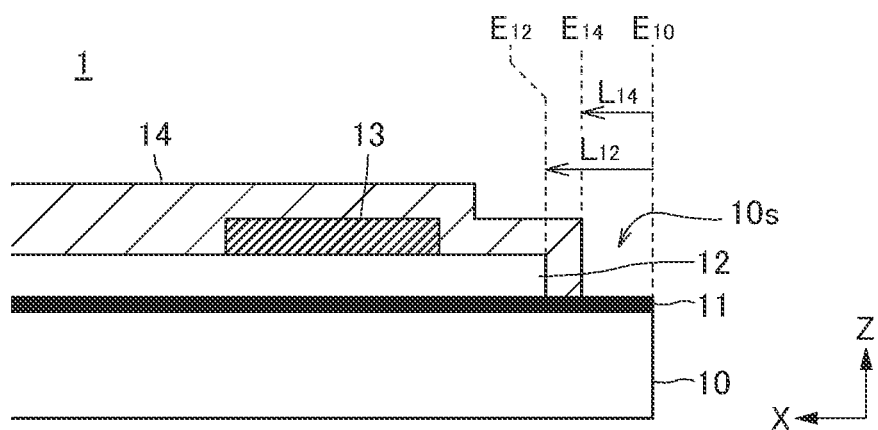

FIGS. 4A to 4C are schematic cross-sectional views each illustrating the configuration of optical modulation elements according to second to fourth embodiments of the present disclosure.

As illustrated in FIG. 4A, the optical modulation element 1 according to the second embodiment is featured in that it further has a protective layer 14 that covers the upper surface of the dielectric layer 12 and the upper surface and side surfaces (exposed surfaces) of the electrode layer 13 and that an outer peripheral end portion $E_{14}$ of the protective layer 14 is positioned inside the outer peripheral end portion $E_{10}$ of the substrate 10 like the dielectric layer 12. Further, the outer peripheral end portion $E_{14}$ of the protective layer 14 is aligned with the outer peripheral end portion $E_{12}$ of the dielectric layer 12. That is, an offset amount $L_{14}$ of the outer peripheral end portion $E_{14}$ of the protective layer 14 is equal to the offset amount Lie of the outer peripheral end portion $E_{12}$ of the dielectric layer 12. Other configurations are the same as those of the first embodiment.

The protective layer 14 plays a role of protecting the dielectric layer 12 and electrode layer 13. Although there is no particular restriction on the material of the protective layer 14, a material having a higher dielectric constant than air is preferably selected. By covering the exposed surfaces of the first and second signal electrodes 4a and 4b with the thus configured protective layer 14, the electrical effective refractive index can be increased, whereby the bandwidth can be improved by velocity matching between light and electricity. In addition, the outer peripheral end portion $E_{14}$ of the protective layer 14 is positioned inside the outer peripheral end portion $E_{10}$ of the substrate 10, so that the protective layer 14 is not cut together with the substrate 10. Thus, it is possible to prevent micropeeling of the protective layer 14 during the cutting process of the substrate 10.

As illustrated in FIG. 4B, the optical modulation element 1 according to the third embodiment is featured in that the outer peripheral end portion $E_{14}$ of the protective layer 14 is positioned inside the outer peripheral end portion $E_{12}$ of the dielectric layer 12. That is, the offset amount $L_{14}$ of the outer peripheral end portion $E_{14}$ of the protective layer 14 is larger than the offset amount $L_{12}$ of the outer peripheral end portion $E_{12}$ of the dielectric layer 12. Other configurations are the same as those of the second embodiment. When different material layers are simultaneously removed by reactive ion etching or the like, micropeeling may sometimes occur between layers, deteriorating the reliability of the optical modulation element. However, in the present embodiment, the outer peripheral end portion $E_{14}$ of the protective layer 14 is positioned inside the outer peripheral end portion $E_{12}$ of the dielectric layer 12, and the protective layer 14 is not removed simultaneously with the dielectric layer 12, so that it is possible to prevent micropeeling of the protective layer 14.

As illustrated in FIG. 4C, the optical modulation element 1 according to the fourth embodiment is featured in that the outer peripheral end portion $E_{14}$ of the protective layer 14 is positioned outside the outer peripheral end portion $E_{12}$ of the dielectric layer 12 and that the outer peripheral end surface of the dielectric layer 12 and a part (a part of the lower stage surface of the step structure 10s) of the upper surface of the waveguide layer 11 are covered with the protective layer 14. That is, the offset amount $L_{14}$ of the outer peripheral end portion $E_{14}$ of the protective layer 14 is smaller than the offset amount $L_{12}$ of the outer peripheral end portion $E_{12}$ of the dielectric layer 12. Other configurations are the same as those of the third embodiment. According to the present embodiment, it is possible to protect the outer peripheral end surface of the dielectric layer 12 in addition to the effect obtained by the third embodiment.

Figure 5A:
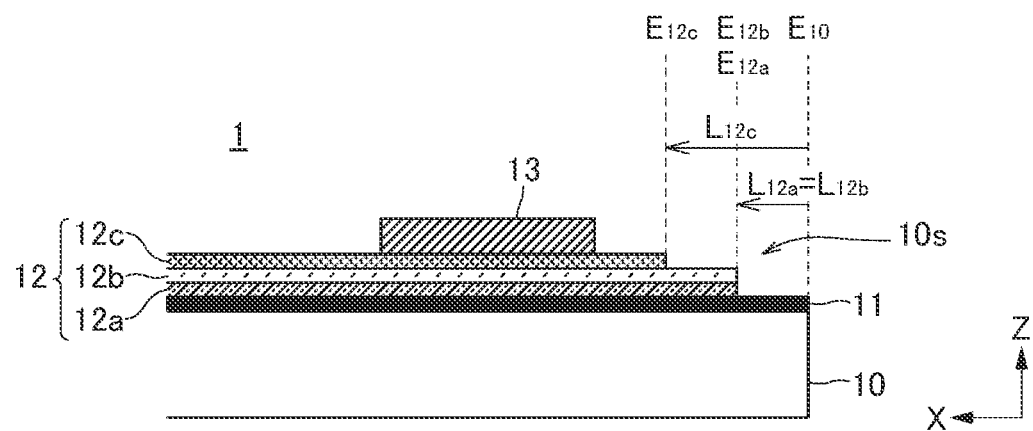
FIGS. 5A to 5C are schematic cross-sectional views each illustrating the configuration of optical modulation elements according to fifth to seventh embodiments of the present disclosure.
Figure 5B:
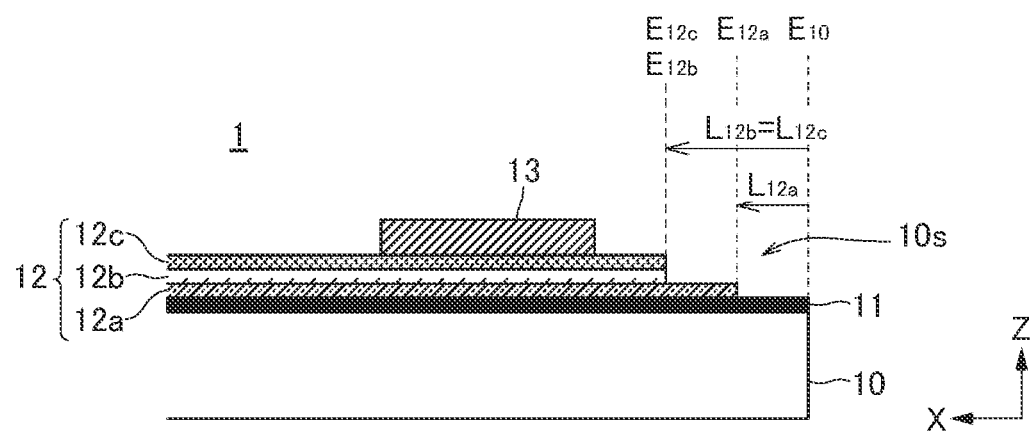
Figure 5C:
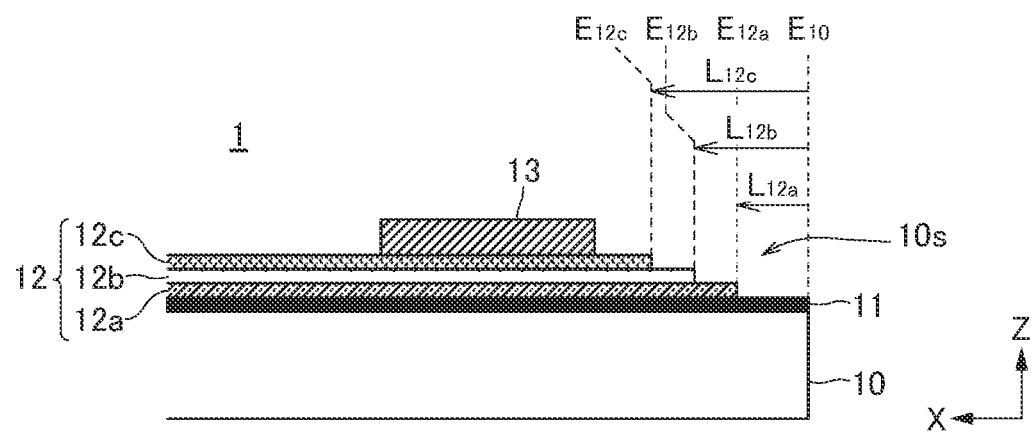

FIGS. 5A to 5C are schematic cross-sectional views each illustrating the configuration of optical modulation elements according to fifth to seventh embodiments of the present disclosure.

As illustrated in FIG. 5A, the optical modulation element 1 according to the fifth embodiment is featured in that the dielectric layer 12 is constituted by a plurality of material layers having different elements or compositions and that the outer peripheral end position of one material layer has an area positioned inside the outer peripheral end positions of other material layers. In the present embodiment, the dielectric layer 12 has a three-layer structure including a lower layer 12a, an intermediate layer 12b, and an upper layer 12c, and outer peripheral end portions $E_{12a}$, $E_{12b}$, and $E_{12c}$ of the above three layers are positioned inside the outer peripheral end portion $E_{10}$ of the substrate 10. Further, the outer peripheral end portion $E_{12c}$ of the upper layer 12c is positioned inside the outer peripheral end portions $E_{12a}$ and $E_{12b}$ of the respective lower layer 12a and intermediate layer 12b. The outer peripheral end portion $E_{12b}$ of the intermediate layer 12b is aligned with the outer peripheral end portion $E_{12a}$ of the lower layer 12a. Accordingly, an offset amount $L_{12c}$ of the outer peripheral end portion $E_{12c}$ of the upper layer 12c is larger than an offset amount $L_{12b}$ of the outer peripheral end portion $E_{12b}$ of the intermediate layer 12b, and the offset amount $L_{12b}$ of the outer peripheral end portion $E_{12b}$ of the intermediate layer 12b is equal to an offset amount $L_{12a}$ of the outer peripheral end portion $E_{12a}$ of the lower layer 12a. Other configurations are the same as those of the first embodiment.

The lower layer 12a is preferably made of $SiO_2$. When the lower layer 12a is formed of an $SiO_2$ film, a part of the lower layer 12a that contacts the waveguide layer 11 can be made low in refractive index, whereby light confinement effect of the optical waveguide can be enhanced.

The intermediate layer 12b is preferably made of a compound containing at least La, Al, Si, and O. When the intermediate layer 12b is formed of an LaAlSiO film, the dielectric contact of the dielectric layer 12 can be made high, whereby a drive voltage for the optical modulation element can be reduced.

The upper layer 12c is preferably made of a compound containing Si, In, and O. When the upper layer 12c is formed of an SiInO film, a part of the upper layer 12c around the electrode is reduced in dielectric constant, whereby a loss can be reduced. Further, DC drift can be reduced to thereby increase the reliability of the optical modulation element.

When different material layers are simultaneously removed by reactive ion etching or the like as described above, micropeeling is likely to occur between layers. However, in the present embodiment, the outer peripheral end portion $E_{12c}$ of the upper layer 12c is positioned inside the outer peripheral end portion $E_{12b}$ of the intermediate layer 12b and the outer peripheral end portion $E_{12a}$ of the lower layer 12a, and the upper layer 12c is not removed simultaneously with the intermediate layer 12b and the lower layer 12a, thus making it possible to prevent the occurrence of micropeeling of the upper layer 12c.

As illustrated in FIG. 5B, the optical modulation element 1 according to the sixth embodiment is featured in that the dielectric layer 12 has a three-layer structure including the lower layer 12a, intermediate layer 12b, and upper layer 12c and that the outer peripheral end portion $E_{12b}$ of the intermediate layer 12b and the outer peripheral end portion $E_{12c}$ of the upper layer 12c are positioned inside the outer peripheral end portion $E_{12a}$ of the lower layer 12a. The outer peripheral end portion $E_{12c}$ of the upper layer 12c is aligned with the outer peripheral end portion $E_{12b}$ of the intermediate layer 12b, and the outer peripheral end portion $E_{12a}$ of the lower layer 12a is positioned inside the outer peripheral end portion $E_{10}$ of the substrate 10. Accordingly, the offset amount $L_{12c}$ of the outer peripheral end portion $E_{12c}$ of the upper layer 12c is equal to the offset amount $L_{12b}$ of the outer peripheral end portion $E_{12b}$ of the intermediate layer 12b and larger than the offset amount $L_{12a}$ of the outer peripheral end portion $E_{12a}$ of the lower layer 12a. Other configurations are the same as those of the fifth embodiment (FIG. 5A).

In the present embodiment, the outer peripheral end portion $E_{12c}$ of the upper layer 12c and the outer peripheral end portion $E_{12b}$ of the intermediate layer 12b are positioned inside the outer peripheral end portion $E_{12a}$ of the lower layer 12a, and the upper layer 12c and intermediate layer 12b are not removed simultaneously with the lower layer 12a, thus making it possible to prevent the occurrence of micropeeling of the intermediate layer 12b.

As illustrated in FIG. 5C, the optical modulation element 1 according to the seventh embodiment is featured in that the dielectric layer 12 has a three-layer structure including the lower layer 12a, intermediate layer 12b, and upper layer 12c and that the outer peripheral end portion $E_{12b}$ of the intermediate layer 12b is positioned inside the outer peripheral end portion $E_{12a}$ of the lower layer 12a and that the outer peripheral end portion $E_{12c}$ of the upper layer 12c is positioned inside the outer peripheral end portion $E_{12b}$ of the intermediate layer 12b. Accordingly, the offset amount $L_{12b}$ of the outer peripheral end portion $E_{12b}$ of the intermediate layer 12b is larger than the offset amount $L_{12a}$ of the lower layer 12a, and the offset amount $L_{12c}$ of the outer peripheral end portion $E_{12c}$ of the upper layer 12c is equal to and larger than the offset amount $L_{12b}$ of the outer peripheral end portion $E_{12b}$ of the intermediate layer 12b. Other configurations are the same as those of the fifth embodiment.

In the present embodiment, the outer peripheral end portion $E_{12c}$ of the upper layer 12c is positioned inside the outer peripheral end portion $E_{12b}$ of the intermediate layer 12b, and the upper layer 12c is not removed simultaneously with the intermediate layer 12b, thus making it possible to prevent the occurrence of micropeeling of the upper layer 12c. In addition, the outer peripheral end portion $E_{12b}$ of the intermediate layer 12b is positioned inside the outer peripheral end portion $E_{12a}$ of the lower layer 12a, and the intermediate layer 12b is not removed simultaneously with the lower layer 12a, thus making it possible to prevent the occurrence of micropeeling of the intermediate layer 12b.

Figure 6A:
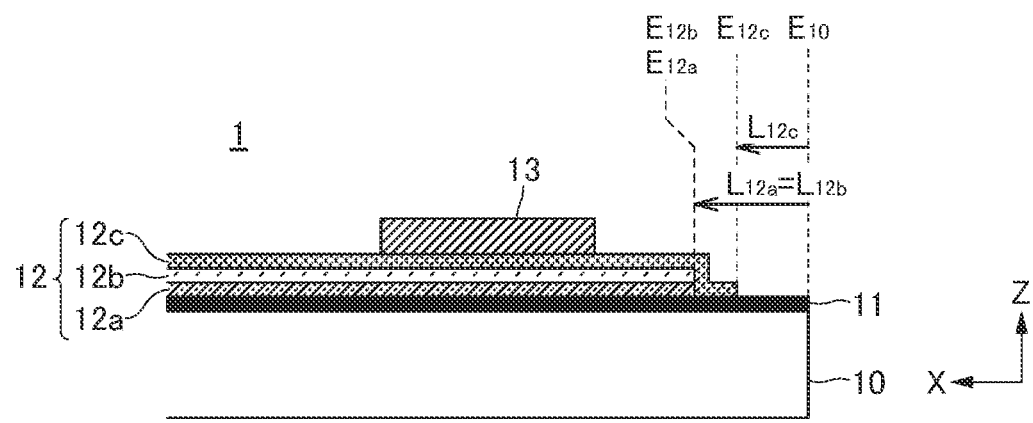
FIGS. 6A to 6C are schematic cross-sectional views each illustrating the configuration of optical modulation elements according to eighth to 10th embodiments of the present disclosure.
Figure 6B:
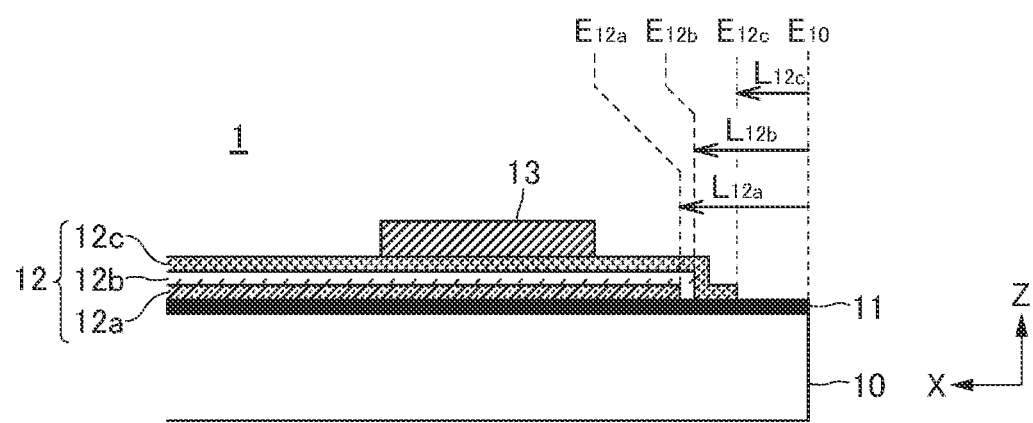
Figure 6C:
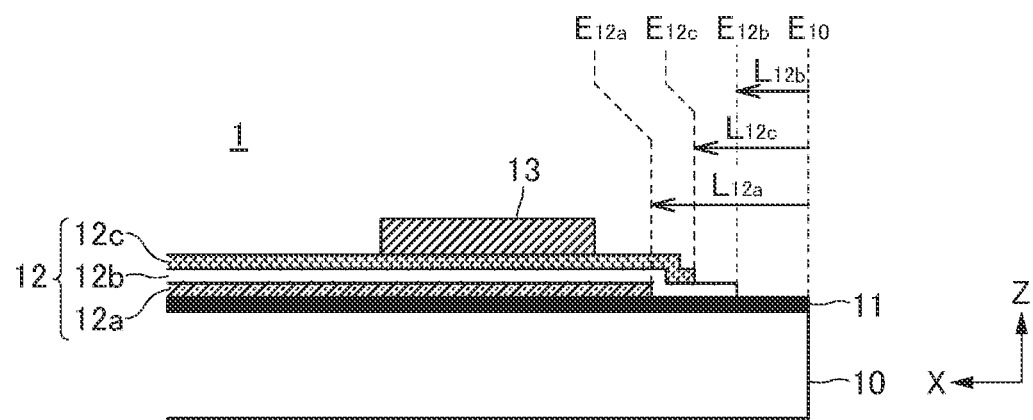

FIGS. 6A to 6C are schematic cross-sectional views each illustrating the configuration of optical modulation elements according to eighth to 10th embodiments of the present disclosure.

As illustrated in FIG. 6A, the optical modulation element 1 according to the eighth embodiment is featured as follows: the dielectric layer 12 has a three-layer structure including the lower layer 12a, intermediate layer 12b, and upper layer 12c; the outer peripheral end, positions $E_{12a}$, $E_{12b}$, and $E_{12c}$ of the above three layers are positioned inside the outer peripheral end portion $E_{10}$ of the substrate 10; the outer peripheral end portion $E_{12c}$ of the upper layer 12c is positioned outside the outer peripheral end portion $E_{12b}$ of the intermediate layer 12b and the outer peripheral end portion $E_{12a}$ of the lower layer 12a; and the upper layer 12c covers the side surface (outer peripheral end surface) of the outer peripheral end portion $E_{12a}$ of the lower layer 12a and the side surface (outer peripheral end surface) of the outer peripheral end portion $E_{12b}$ of the intermediate layer 12b. Accordingly, the offset amount $L_{12c}$ of the outer peripheral end portion $E_{12c}$ of the upper layer 12c is smaller than the offset amount $L_{12b}$ of the outer peripheral end portion $E_{12b}$ of the intermediate layer 12b, and the offset amount $L_{12b}$ of the outer peripheral end portion $E_{12b}$ of the intermediate layer 12b is equal to the offset amount $L_{12a}$ of the outer peripheral end portion $E_{12a}$ of the lower layer 12a. Other configurations are the same as those of the fifth embodiment. According to the present embodiment, it is possible to protect the outer peripheral end surfaces of the intermediate layer 12b and the lower layer 12a in addition to the effect obtained by the fifth embodiment.

As illustrated in FIG. 6B, the optical modulation element 1 according to the ninth embodiment is featured in that the outer peripheral end portion $E_{12b}$ of the intermediate layer 12b is positioned outside the outer peripheral end portion $E_{12a}$ of the lower layer 12a and that the outer peripheral end portion $E_{12c}$ of the upper layer 12c is positioned outside the outer peripheral end portion $E_{12b}$ of the intermediate layer 12b. Accordingly, the offset amount $L_{12c}$ of the outer peripheral end portion $E_{12c}$ of the upper layer 12c is smaller than the offset amount $L_{12b}$ of the outer peripheral end portion $E_{12b}$ of the intermediate layer 12b, and the offset amount $L_{12b}$ of the outer peripheral end portion $E_{12b}$ of the intermediate layer 12b is smaller than the offset amount $L_{12a}$ of the outer peripheral end portion $E_{12a}$ of the lower layer 12a. Other configurations are the same as those of the eighth embodiment. In the present embodiment as well, it is possible to protect the outer peripheral end surfaces of the intermediate layer 12b and the lower layer 12a.

As illustrated in FIG. 6C, the optical modulation element 1 according to the 10th embodiment is featured in that the outer peripheral end portion $E_{12b}$ of the intermediate layer 12b is positioned outside the outer peripheral end portion $E_{12c}$ of the upper layer 12c and that the outer peripheral end portion $E_{12c}$ of the upper layer 12c is positioned outside the outer peripheral end portion $E_{12a}$ of the lower layer 12a. Accordingly, the offset amount $L_{12b}$ of the outer peripheral end portion $E_{12b}$ of the intermediate layer 12b is smaller than the offset amount $L_{12c}$ of the outer peripheral end portion $E_{12c}$ of the upper layer 12c, and the offset amount $L_{12c}$ of the outer peripheral end portion $E_{12c}$ of the upper layer 12c is smaller than the offset amount $L_{12a}$ of the outer peripheral end portion $E_{12a}$ of the lower layer 12a. Other configurations are the same as those of the eighth embodiment. According to the present embodiment, it is possible to protect the outer peripheral end surface of the lower layer 12a.

Figure 7A:
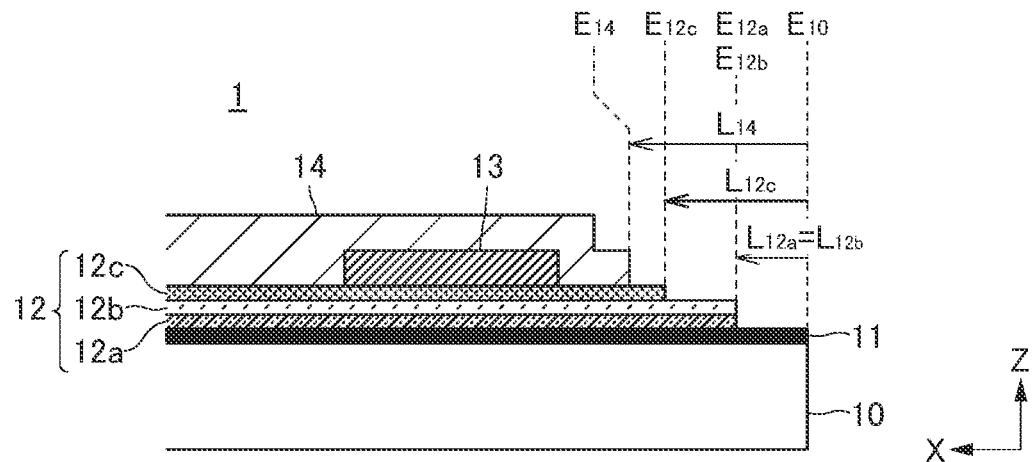
FIGS. 7A to 7C are schematic cross-sectional views each illustrating the configuration of optical modulation elements according to 11th to 13th embodiments of the present disclosure.
Figure 7B:
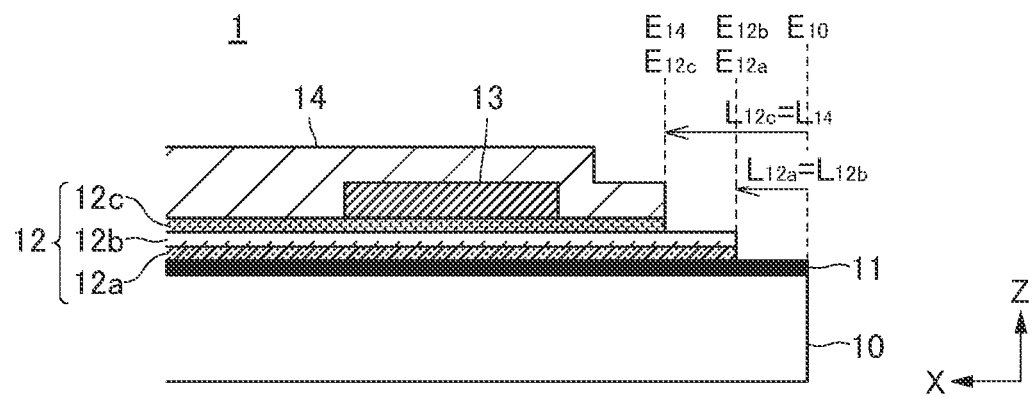
Figure 7C:
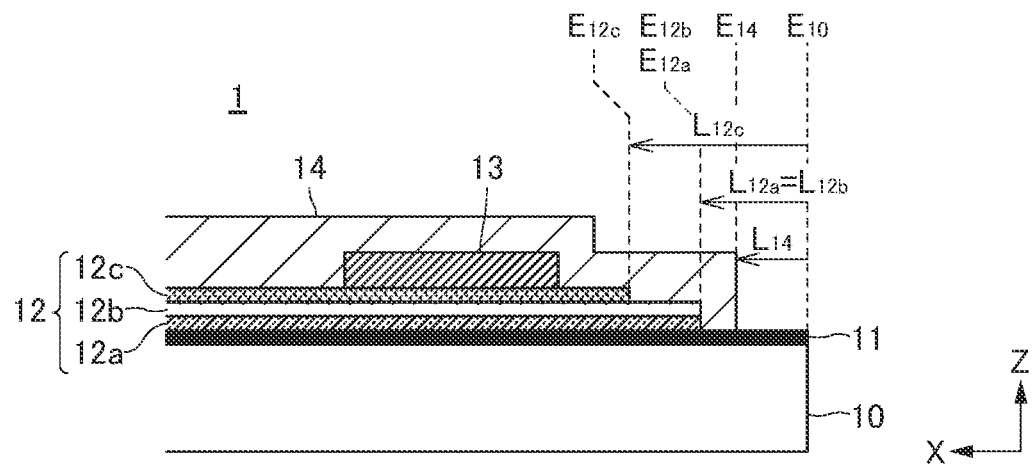

FIGS. 7A to 7C are schematic cross-sectional views each illustrating the configuration of optical modulation elements according to 11th to 13th embodiments of the present disclosure.

As illustrated in FIG. 7A, the optical modulation element 1 according to the 11th embodiment is a combination of the embodiments illustrated in FIG. 4B and FIG. 5A and is featured as follows: the optical modulation element 1 further has the protective layer 14 that covers the upper surface of the dielectric layer 12 and the upper surface of the electrode layer 13; the dielectric layer 12 includes the lower layer 12a, intermediate layer 12b, and upper layer 12c; and the outer peripheral end portion $E_{12c}$ of the upper layer 12c is positioned inside the outer peripheral end portion $E_{12a}$ of the lower layer 12a and the outer peripheral end portion $E_{12b}$ of the intermediate layer 12b. Further, the outer peripheral end portion $E_{14}$ of the protective layer 14 is positioned inside the outer peripheral end portion $E_{12c}$ of the upper layer 12c of the dielectric layer 12. Accordingly, the offset amount $L_{12c}$ of the outer peripheral end portion $E_{12c}$ of the upper layer 12c is larger than the offset amount $L_{12b}$ of the outer peripheral end portion $E_{12b}$ of the intermediate layer 12b and the offset amount $L_{12a}$ of the outer peripheral end portion $E_{12a}$ of the lower layer 12a, and the offset amount $L_{14}$ of the outer peripheral end portion $E_{14}$ of the protective layer 14 is larger than the offset amount $L_{12c}$ of the outer peripheral end portion $E_{12c}$ of the upper layer 12c. According to the present embodiment, the same effects as those obtained by the third and fifth embodiments can be achieved.

As illustrated in FIG. 7B, the optical modulation element 1 according to the 12th embodiment is a combination of the embodiments illustrated in FIG. 4A and FIG. 5A and is featured as follows: the optical modulation element 1 further has the protective layer 14 that covers the upper surface of the dielectric layer 12 and the upper surface of the electrode layer 13; the dielectric layer 12 includes the lower layer 12a, intermediate layer 12b, and upper layer 12c; and the outer peripheral end portion $E_{12c}$ of the upper layer 12c is positioned inside the outer peripheral end portion $E_{12a}$ of the lower layer 12a and the outer peripheral end portion $E_{12b}$ of the intermediate layer 12b. Further, the outer peripheral end portion $E_{14}$ of the protective layer 14 is aligned with the outer peripheral end portion $E_{12c}$ of the upper layer 12c of the dielectric layer 12. Accordingly, the offset amount $L_{12c}$ of the outer peripheral end portion $E_{12c}$ of the upper layer 12c is larger than the offset amount $L_{12b}$ of the outer peripheral end portion $E_{12b}$ of the intermediate layer 12b and the offset amount Lila of the outer peripheral end portion $E_{12a}$ of the lower layer 12a, and the offset amount $L_{14}$ of the outer peripheral end portion $E_{14}$ of the protective layer 14 is equal to the offset amount $L_{12c}$ of the outer peripheral end portion $E_{12c}$ of the upper layer 12c. According to the present embodiment, the same effects as produced by the second and fifth embodiments can be achieved.

As illustrated in FIG. 7C, the optical modulation element 1 according to the 13th embodiment is a combination of the embodiments illustrated in FIG. 4C and FIG. 5A and is featured as follows: the optical modulation element 1 further has the protective layer 14 that covers the upper surface of the dielectric layer 12 and the upper surface of the electrode layer 13; the dielectric layer 12 includes the lower layer 12a, intermediate layer 12b, and upper layer 12c; and the outer peripheral end portion $E_{12c}$ of the upper layer 12c is positioned inside the outer peripheral end portion $E_{12a}$ of the lower layer 12a and the outer peripheral end portion $E_{12b}$ of the intermediate layer 12b. Further, the outer peripheral end portion $E_{14}$ of the protective layer 14 is positioned outside the outer peripheral end portion $E_{12a}$ of the lower layer 12a of the dielectric layer 12 and the outer peripheral end portion $E_{12b}$ of the intermediate layer 12b, and the protective layer 14 covers the outer peripheral end surfaces of the respective lower layer 12a, intermediate layer 12b, and upper layer 12c. Accordingly, the offset amount $L_{14}$ of the outer peripheral end portion $E_{14}$ of the protective layer 14 is smaller than the offset amount $L_{12a}$ of the outer peripheral end portion $E_{12a}$ of the lower layer 12a and the offset amount $L_{12b}$ of the outer peripheral end portion $E_{12b}$ of the intermediate layer 12b. According to the present embodiment, the same effects as those produced by the third and fifth embodiments can be achieved.

Figure 8:
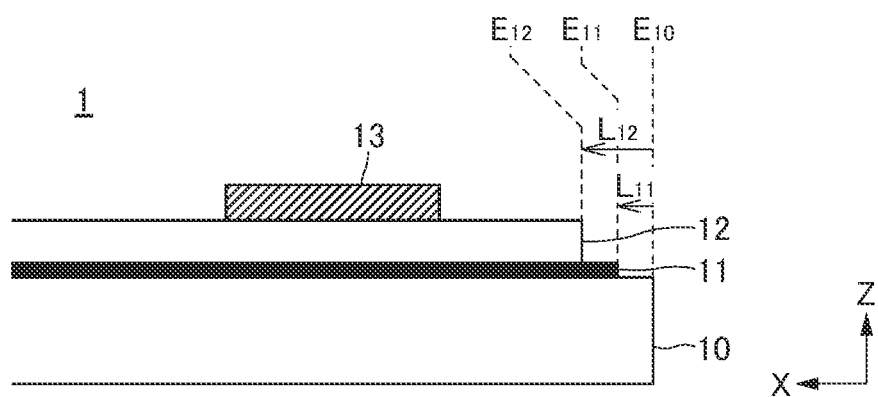
FIG. 8 is a schematic cross-sectional view illustrating the configuration of an optical modulation element according to a 14th embodiment of the present disclosure.

FIG. 8 is a schematic cross-sectional view illustrating the configuration of an optical modulation element according to a 14th embodiment of the present disclosure.

As illustrated in FIG. 8, the optical modulation element 1 according to the 14th embodiment is featured in that the outer peripheral end portion $E_{11}$ of the waveguide layer 11 is positioned inside the outer peripheral end portion $E_{10}$ of the substrate 10. The offset amount $L_{11}$ of the outer peripheral end portion $E_{11}$ of the waveguide layer 11 is smaller than the offset amount $L_{12}$ of the outer peripheral end portion $E_{12}$ of the dielectric layer 12. Other configurations of the same as those of the first embodiment.

When the waveguide layer 11 is formed not by an epitaxial method but by gluing or the like, micropeeling is likely to occur at the interface between the waveguide layer 11 and the substrate 10 upon simultaneous cutting of the waveguide layer 11 and substrate 10. However, when the waveguide layer 11 is not provided on the cutting line of the substrate 10, micropeeling of the waveguide layer 11 during the cutting process of the substrate 10 can be prevented. Further, when the waveguide layer 11 is formed by an epitaxial method, it is possible to reliably prevent the occurrence of micropeeling of the waveguide layer 11 during the cutting process of the substrate 10.

Although, in the present embodiment, the outer peripheral end portion $E_{12}$ of the dielectric layer 12 is positioned inside the outer peripheral end portion $E_{11}$ of the waveguide layer 11, the outer peripheral end portion $E_{12}$ of the dielectric layer 12 may be positioned outside the outer peripheral end portion $E_{11}$ of the waveguide layer 11. That is, the offset amount $L_{11}$ of the outer peripheral end portion $E_{11}$ of the waveguide layer 11 may be larger than the offset amount $L_{12}$ of the outer peripheral end portion $E_{12}$ of the dielectric layer 12. In this case, the outer peripheral end surface of the waveguide layer 11 is covered with the dielectric layer 12.

Figure 9:
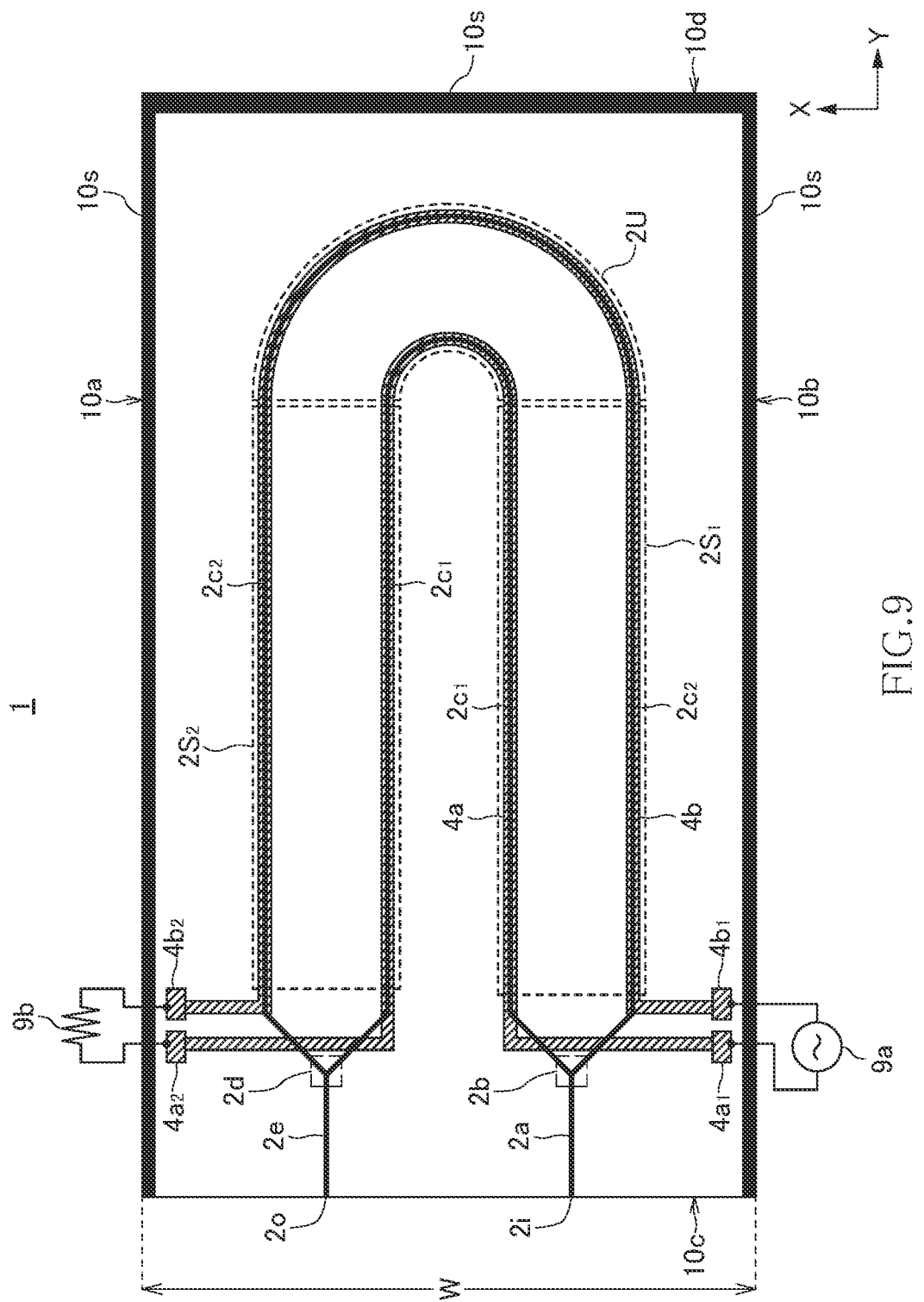
FIG. 9 is a schematic plan view illustrating the configuration of an optical modulation element according to a 15th embodiment of the present disclosure.

FIG. 9 is a schematic plan view illustrating the configuration of an optical modulation element according to a 15th embodiment of the present disclosure.

As illustrated in FIG. 9, the optical modulation element 1 according to the 15th embodiment is featured in that the Mach-Zehnder optical waveguide 2 has a single folded structure. More specifically, first and second waveguides $2c_1$ and $2c_2$ of the Mach-Zehnder optical waveguide 2 have a first straight section $2S_1$, a curved part 2U that turns the traveling direction of the first straight section $2S_1$ by 180°, and a second straight section $2S_2$ extending parallel to the first straight section $2S_1$.

The substrate 10 has first and second sides 10a and 10b which are parallel to the longitudinal direction thereof (Y-direction) and third and fourth sides 10c and 10d perpendicular to the longitudinal direction of the substrate 10, and the optical input port 2i and optical output port 2o are both provided at the third side 10c of the substrate 10. The first and second waveguides $2c_1$ and $2c_2$ of the first straight section $2S_1$ travel in parallel to each other from the third side 10c to the fourth side 10d. The first and second waveguides $2c_1$ and $2c_2$ of the curved part 2U are formed into concentric semicircles for turning the traveling direction of the first straight section $2S_1$ by 180 degrees. The first and second waveguides $2c_1$ and $2c_2$ of the second straight section $2S_2$ travel in parallel to each other from the fourth side 10d to the third side 10c.

The first and second signal electrodes 4a and 4b are each continuously formed along the first straight section $2S_1$, curved part 2U, and second straight section $2S_2$ of the Mach-Zehnder optical waveguide 2. Forming the signal electrode as long as possible along not only the straight section but also the curved part can reduce a drive voltage. Optical modulation elements have a practical problem that the long side of the main body has a long length; however, adopting such a folded structure can significantly reduce the length of the long side, allowing achievement of both lowered drive voltage and miniaturization. In particular, an optical waveguide formed using a lithium niobate film has a reduced loss even when the curvature radius of the curved part 2U is reduced to about 50 µm and is thus suitably applied to the present embodiment.

The optical modulation element 1 according to the present embodiment is configured such that the optical input port 2i and optical output port 2o of the Mach-Zehnder optical waveguide 2 are drawn to the third side 10c side of the substrate 10, so that the step structure 10s is not provided at the third side 10c. The step structure 10s is provided at the other sides, i.e., first side 10a, second side 10b, and fourth side 10d. When the Mach-Zehnder optical waveguide 2 is folded one time or odd number of times, the optical input port 2i and optical output port 2o are drawn in the same direction, so that it is only necessary to set only one side (third side 10c) at which the optical input port 2i and optical output port 2o are drawn as the formation exclusion area of the step structure 10s. That is, the step structure 10s can be provided at the remaining three sides (first side 10a, second side 10b, and fourth side 10d), whereby the occurrence of micropeeling of the dielectric layer 12 during the cutting process of the substrate 10 can be prevented.

When the Mach-Zehnder optical waveguide 2 is folded even number of times, the optical input port 2i and optical output port 2o are drawn in mutually opposite directions as in the structure illustrated in FIG. 1, where the Mach-Zehnder optical waveguide 2 is not folded, so that it is only necessary to set only two sides (third side 10c and fourth side 10d) at which the optical input port 2i and optical output port 2o are drawn as the formation exclusion area of the step structure 10s. That is, the step structure 10s can be provided at the remaining two sides (first side 10a and second side 10b), whereby the occurrence of micropeeling of the dielectric layer 12 during the cutting process of the substrate 10 can be prevented.

As described above, in the optical modulation element according to the present embodiment, both the optical input port 2i and optical output port 2o of the Mach-Zehnder optical waveguide 2 are drawn to the third side 10c, which is one of the four sides of the substrate 10, and the step structure 10s is provided at the remaining three sides, whereby the occurrence of micropeeling of the dielectric layer 12 can be prevented at these three sides.

While the preferred embodiments of the present disclosure have been described above, the present disclosure is not limited to the above embodiments, and various modifications may be made within the scope of the present disclosure, and all such modifications are included in the present disclosure.

The technology according to the present disclosure includes the following configuration examples, but not limited thereto.

An optical modulation element according to an embodiment of the present disclosure includes: a substrate; a waveguide layer formed on the substrate; a dielectric layer formed on the waveguide layer; and an electrode formed on the dielectric layer. The outer peripheral end portion of the dielectric layer has an offset area positioned inside the outer peripheral end portion of the substrate. In at least a part of the offset area, the distance from the outer peripheral end portion of substrate to the outer peripheral end portion of the dielectric layer is equal to or less than the distance from the outer peripheral end portion of the substrate to the outer peripheral end portion of the electrode. With this configuration, the substrate is widely covered with and protected by the dielectric layer. Further, the dielectric layer can be avoided from being cut together with the substrate during the cutting process of the substrate, whereby it is possible to prevent occurrence of micropeeling of the dielectric layer at the outer peripheral end portion of the substrate. Further, it is also possible to prevent the occurrence of micropeeling of the dielectric layer when the optical modulation element receives an external shock. Thus, reliability of the optical modulation element can be increased.

The optical modulation element may further include a protective layer formed at least on the electrode and dielectric layer, and the outer peripheral end portion of the protective layer may have an area positioned inside the outer peripheral end portions of the respective substrate and waveguide layer. This can not only suppress degradation of the electrode but also increase an electrical effective refractive index to improve the bandwidth of the optical modulation element. Further, it is possible to reduce a probability that micropeeling of the protective layer occurs at the outer peripheral end portion of the substrate during the cutting process of the substrate.

The outer peripheral end portion of the protective layer may have an area positioned inside the outer peripheral end portion of the dielectric layer. Alternatively, the outer peripheral end portion of the protective layer may have an area positioned outside the outer peripheral end portion of the dielectric layer, and the protective layer may cover the end surface of the dielectric layer in this area. When different material layers are simultaneously removed by reactive ion etching or the like, micropeeling may sometimes occur between layers, deteriorating reliability of the optical modulation element. However, when the position of the outer peripheral end portion of the protective layer is made different from the outer peripheral end portion of the dielectric layer, and the protective layer and dielectric layer are removed in different processes, the occurrence of micropeeling of the protective layer can be prevented.

The dielectric layer may have a plurality of material layers having different elements or compositions, and the outer peripheral end position of at least one material layer may have an area positioned inside the outer peripheral end positions of one or other material layers. When the dielectric layer is formed of a plurality of layers, and the material thereof is changed for each layer, the performance of the optical modulation element can be improved (for example, a drive voltage can be reduced). Further, when the plurality of material layers are made different in the position of the outer peripheral end portion and removed in different processes, the occurrence of micropeeling of the material layers can be prevented.

The dielectric layer may have a plurality of material layers having different elements or compositions, and the outer peripheral end portion of an upper layer in the plurality of material layers may have an area positioned inside the outer peripheral end portion of a lower layer. This makes it possible to prevent the occurrence of micropeeling of the upper layer.

The dielectric layer may have a plurality of material layers having different elements or compositions, the outer peripheral end portion of an upper layer of the plurality of material layers may have an area positioned outside the outer peripheral end portion of a lower layer, and the upper layer may cover the end surface of the lower layer in this area. This makes it possible to prevent the occurrence of micropeeling of the upper layer and to protect the end surface of the lower layer.

The dielectric layer may have a plurality of material layers having different elements or compositions, the plurality of material layers may include an upper layer, a lower layer, and an intermediate layer positioned between the upper layer and the lower layer, and the outer peripheral end portion of the upper layer may have an area positioned inside each outer peripheral end portion of the intermediate layer and the lower layer. This makes it possible to prevent the occurrence of micropeeling of the upper layer which is capable of improving characteristics of the waveguide layer and electrode.

The dielectric layer may have a plurality of material layers having different elements or compositions, the plurality of material layers may include an upper layer, a lower layer, and an intermediate layer positioned between the upper layer and the lower layer, and each outer peripheral end portion of the upper layer and the intermediate layer may have an area positioned inside the outer peripheral end portion of the lower layer. This makes it possible to prevent the occurrence of micropeeling of the intermediate layer.

The dielectric layer may have a plurality of material layers having different elements or compositions, the plurality of material layers may include an upper layer, a lower layer, and an intermediate layer positioned between the upper layer and the lower layer, the outer peripheral end portion of the upper layer may have an area positioned outside each outer peripheral end portions of the intermediate layer and the lower layer, and the upper layer may cover each end surface of the intermediate layer and the lower layer in this area. This makes it possible to prevent the occurrence of micropeeling of the intermediate and upper layers.

The dielectric layer may have a plurality of material layers having different elements or compositions, the plurality of material layers may include an upper layer, a lower layer, and an intermediate layer positioned between the upper layer and the lower layer, the outer peripheral end portion of the upper layer may have an area positioned outside the outer peripheral end portion of the lower layer, and the outer peripheral end portion of the intermediate layer may have an area positioned outside each outer peripheral end portion of the upper layer and the lower layer. This makes it possible to prevent the occurrence of micropeeling of the intermediate and upper layers and to protect the end surfaces of the lower layer and the intermediate layer.

The upper layer may be made of a compound containing Si, In, and O, the intermediate layer may be made of a compound containing at least La, Al, Si, and O, and the lower layer may be made of $SiO_2$. With this configuration, a transmission loss of the optical waveguide and a drive voltage can be reduced to improve the performance of the optical modulation element. When the dielectric layer has a multilayer structure, a probability that micropeeling of the constituent layers occurs during the cutting process of the substrate increases; however, by removing the dielectric layer from the vicinity of the substrate cutting position ahead of time, micropeeling of the constituent layers can be prevented.

The outer peripheral end portion of the waveguide layer may have an area positioned inside the outer peripheral end portion of the substrate. When the waveguide layer is formed by gluing or the like, micropeeling is likely to occur during the cutting process of the substrate. However, when the outer peripheral end portion of the waveguide layer is positioned inside the outer peripheral end portion of the substrate, it is possible to reliably prevent the occurrence of micropeeling of the waveguide layer.

An optical input port and an optical output port of the optical wave guide which are formed in the waveguide layer may be provided at the outer peripheral end portion of the substrate, and a step structure wherein the outer peripheral end portion of the dielectric layer is positioned inside the outer peripheral end portion of the substrate may be provided in an area excluding the vicinity of the formation positions of the optical input port and the optical output port. In this case, the step structure is preferably formed at all sides constituting the outer periphery of the substrate excluding the side (or sides) at which the optical input and output ports are provided. Thus, it is possible to achieve the function of the optical input and output ports of the optical waveguide while preventing the occurrence of micropeeling of the dielectric layer.

The waveguide layer may be formed of a lithium niobate film or an epitaxial film made of lithium niobate. With this configuration, significant reduction in the size of the optical modulation element and in drive voltage for the optical modulation element can be achieved. Further, even when the waveguide layer is cut together with the substrate, a probability that micropeeling of the waveguide layer occurs can be reduced.

The offset amount of the dielectric layer may be 10% or less of the width of the substrate in the same direction as the offset direction of the dielectric layer. When the offset amount of the dielectric layer is thus 10% or less of the width of the substrate, the substrate is widely covered with and protected by the dielectric layer. Further, the dielectric layer can be avoided from being cut together with the substrate during the cutting process of the substrate, whereby it is possible to prevent the occurrence of micropeeling of the dielectric layer at the outer peripheral end portion of the substrate.

The offset area may be provided at least in the formation area of the interactive part of the electrode. When the outer peripheral end portion of the dielectric layer is offset in the formation area of the interactive part, the dielectric layer can be avoided from being cut together with the substrate during the cutting process of the substrate, whereby it is possible to prevent the occurrence of micropeeling of the dielectric layer at the outer peripheral end portion of the substrate.

In the above respective embodiments, the optical modulation element has a pair of optical waveguides each formed of a lithium niobate film epitaxially grown on the substrate 10; however, the present disclosure is not limited to such a structure, and the optical waveguides may be formed of an electrooptic material such as barium titanate or lead zirconium titanate. Further, as the waveguide layer 11, a semiconductor material, a polymer material, or the like having electrooptic effect may be used.

What is claimed is:

1. An optical modulation element comprising:
   a substrate;
   a waveguide layer formed on the substrate;
   a dielectric layer formed on the waveguide layer;
   an electrode formed on the dielectric layer; and
   a protective layer formed at least on the electrode and the dielectric layer, wherein
   an outer peripheral end portion of the dielectric layer has an offset area positioned inside an outer peripheral end portion of the substrate,
   an outer peripheral end portion of the protective layer has an area positioned inside the outer peripheral end portions of the substrate and the waveguide layer, and
   in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode.

2. The optical modulation element as claimed in claim 1, wherein
   the outer peripheral end portion of the protective layer has an area positioned inside the outer peripheral end portion of the dielectric layer.

3. The optical modulation element as claimed in claim 1, wherein
   the outer peripheral end portion of the protective layer has an area positioned outside the outer peripheral end portion of the dielectric layer, and
   the protective layer covers an end surface of the dielectric layer in this area.

4. The optical modulation element as claimed in claim 1, wherein
   the dielectric layer has a plurality of material layers having different elements or compositions, and
   an outer peripheral end portion of a least one material layer has an area positioned inside an outer peripheral end portion of one or other material layers.

5. The optical modulation element as claimed in claim 1, wherein
   the dielectric layer has a plurality of material layers having different elements or compositions, and
   an outer peripheral end portion of an upper layer in the plurality of material layers has an area positioned inside an outer peripheral end portion of a lower layer.

6. The optical modulation element as claimed in claim 1, wherein
   the dielectric layer has a plurality of material layers with different elements or compositions,
   an outer peripheral end portion of an upper layer in the plurality of material layers has an area positioned outside an outer peripheral end portion of the lower layer, and,
   the upper layer covers an end surface of the lower layer in this area.

7. The optical modulation element as claimed in claim 1, wherein
   the dielectric layer has a plurality of material layers having different elements or compositions,
   the plurality of material layers includes an upper layer, a lower layer and an intermediate layer positioned between the upper layer and the lower layer, and
   an outer peripheral end portion of the upper layer has an area positioned inside each outer peripheral end portion of the intermediate layer and the lower layer.

8. The optical modulation element as claimed in claim 7, wherein
   the upper layer is made of a compound containing Si, In, and O,
   the intermediate layer is made of a compound containing at least at least La, Al, Si, and O, and
   the lower layer is made of $SiO_2$.

9. The optical modulation element as claimed in claim 1, wherein
   the dielectric layer has a plurality of material layers having different elements or compositions,
   the plurality of material layers includes an upper layer, a lower layer and an intermediate layer positioned between the upper layer and the lower layer, and
   each outer peripheral end portion of the upper layer and the intermediate layer has an area positioned inside an outer peripheral end portion of the lower layer.

10. The optical modulation element as claimed in claim 1, wherein
    the dielectric layer has a plurality of material layers having different elements or compositions,
    the plurality of material layers includes an upper layer, a lower layer and an intermediate layer positioned between the upper layer and the lower layer,
    an outer peripheral end portion of the upper layer has an area positioned outside each outer peripheral end portion of the lower layer and the intermediate layer, and
    the upper layer covers each end surface of the intermediate layer and the lower layer in this area.

11. The optical modulation element as claimed in claim 1, wherein
    the dielectric layer has a plurality of material layers having different elements or compositions,
    the plurality of material layers includes an upper layer, a lower layer and an intermediate layer positioned between the upper layer and the lower layer,
    an outer peripheral end portion of the upper layer has an area positioned outside the outer peripheral end portion of the lower layer, and
    an outer peripheral end portion of the intermediate layer has an area positioned outside each outer peripheral end portion of the upper layer and the lower layer.

12. The optical modulation element as claimed in claim 1, wherein an outer peripheral end portion of the waveguide layer has an area positioned inside the outer peripheral end portion of the substrate.

13. The optical modulation element as claimed in claim 1, wherein
an optical input port and an optical output port of an optical waveguide which are formed in the waveguide layer are provided at the outer peripheral end portion of the substrate, and
a step structure wherein the outer peripheral end portion of the dielectric layer is positioned inside the outer peripheral end portion of the substrate is provided in an area excluding a vicinity of formation positions of the optical input port and the optical output port.

14. The optical modulation element as claimed in claim 1, wherein the waveguide layer is formed of a lithium niobate film.

15. The optical modulation element as claimed in claim 1, wherein
an offset amount of the dielectric layer is 10% or less of a width of the substrate in the same direction as the offset direction of the dielectric layer.

16. The optical modulation element as claimed in claim 1, wherein
the offset area is provided at least in a formation area of an interactive part of the electrode.

17. An optical modulation element comprising:
a substrate;
a waveguide layer formed on the substrate;
a dielectric layer formed on the waveguide layer; and
an electrode formed on the dielectric layer, wherein
an outer peripheral end portion of the dielectric layer has an offset area positioned inside an outer peripheral end portion of the substrate,
in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode,
the dielectric layer has a plurality of material layers with different elements or compositions,
an outer peripheral end portion of an upper layer in the plurality of material layers has an area positioned outside an outer peripheral end portion of the lower layer, and,
the upper layer covers an end surface of the lower layer in this area.

18. The optical modulation element as claimed in claim 17, wherein
the upper layer is made of a compound containing Si, In, and O, and
the lower layer is made of $SiO_2$.

19. An optical modulation element comprising:
a substrate;
a waveguide layer formed on the substrate;
a dielectric layer formed on the waveguide layer; and
an electrode formed on the dielectric layer, wherein
an outer peripheral end portion of the dielectric layer has an offset area positioned inside an outer peripheral end portion of the substrate,
in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode, the dielectric layer has a plurality of material layers having different elements or compositions,
the plurality of material layers includes an upper layer, a lower layer and an intermediate layer positioned between the upper layer and the lower layer, and
an outer peripheral end portion of the upper layer has an area positioned inside each outer peripheral end portion of the intermediate layer and the lower layer.

20. The optical modulation element as claimed in claim 19, wherein
the upper layer is made of a compound containing Si, In, and O,
the intermediate layer is made of a compound containing at least at least La, Al, Si, and O, and
the lower layer is made of $SiO_2$.

21. An optical modulation element comprising:
a substrate;
a waveguide layer formed on the substrate;
a dielectric layer formed on the waveguide layer; and
an electrode formed on the dielectric layer, wherein
an outer peripheral end portion of the dielectric layer has an offset area positioned inside an outer peripheral end portion of the substrate,
in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode,
the dielectric layer has a plurality of material layers having different elements or compositions,
the plurality of material layers includes an upper layer, a lower layer and an intermediate layer positioned between the upper layer and the lower layer, and
each outer peripheral end portion of the upper layer and the intermediate layer has an area positioned inside an outer peripheral end portion of the lower layer.

22. The optical modulation element as claimed in claim 21, wherein
the upper layer is made of a compound containing Si, In, and O,
the intermediate layer is made of a compound containing at least at least La, Al, Si, and O, and
the lower layer is made of $SiO_2$.

23. An optical modulation element comprising:
a substrate;
a waveguide layer formed on the substrate;
a dielectric layer formed on the waveguide layer; and
an electrode formed on the dielectric layer, wherein
an outer peripheral end portion of the dielectric layer has an offset area positioned inside an outer peripheral end portion of the substrate,
in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode,
the dielectric layer has a plurality of material layers having different elements or compositions,
the plurality of material layers includes an upper layer, a lower layer and an intermediate layer positioned between the upper layer and the lower layer,
an outer peripheral end portion of the upper layer has an area positioned outside each outer peripheral end portion of the lower layer and the intermediate layer, and the upper layer covers each end surface of the intermediate layer and the lower layer in this area.

24. The optical modulation element as claimed in claim 23, wherein
the upper layer is made of a compound containing Si, In, and O,
the intermediate layer is made of a compound containing at least at least La, Al, Si, and O, and
the lower layer is made of $SiO_2$.

25. An optical modulation element comprising:
a substrate;
a waveguide layer formed on the substrate;
a dielectric layer formed on the waveguide layer; and
an electrode formed on the dielectric layer, wherein
an outer peripheral end portion of the dielectric layer has an offset area positioned inside an outer peripheral end portion of the substrate,
in at least a part of the offset area, a distance from the outer peripheral end portion of the substrate to the outer peripheral end portion of the dielectric layer is equal to or less than a distance from the outer peripheral end portion of the substrate to the outer peripheral end portion of the electrode,
the dielectric layer has a plurality of material layers having different elements or compositions,
the plurality of material layers includes an upper layer, a lower layer and an intermediate layer positioned between the upper layer and the lower layer,
an outer peripheral end portion of the upper layer has an area positioned outside the outer peripheral end portion of the lower layer, and
an outer peripheral end portion of the intermediate layer has an area positioned outside each outer peripheral end portion of the upper layer and the lower layer.

26. The optical modulation element as claimed in claim 25, wherein
the upper layer is made of a compound containing Si, In, and O,
the intermediate layer is made of a compound containing at least at least La, Al, Si, and O, and
the lower layer is made of $SiO_2$.

* * * * *